(12) United States Patent
Jeong et al.

(10) Patent No.: US 11,515,593 B2
(45) Date of Patent: Nov. 29, 2022

(54) BATTERY MODULE AND BATTERY PACK INCLUDING THE SAME

(71) Applicant: LG Chem, Ltd., Seoul (KR)

(72) Inventors: Jee Hoon Jeong, Daejeon (KR); Junyeob Seong, Daejeon (KR); Kitaek Jung, Daejeon (KR)

(73) Assignee: LG Energy Solution, Ltd.

( * ) Notice: Subject to any disclaimer, the term of this patent is extended or adjusted under 35 U.S.C. 154(b) by 46 days.

(21) Appl. No.: 17/058,708

(22) PCT Filed: Apr. 10, 2020

(86) PCT No.: PCT/KR2020/004890
§ 371 (c)(1),
(2) Date: Nov. 25, 2020

(87) PCT Pub. No.: WO2020/262812
PCT Pub. Date: Dec. 30, 2020

(65) Prior Publication Data
US 2021/0265685 A1    Aug. 26, 2021

(30) Foreign Application Priority Data
Jun. 25, 2019    (KR) .......................... 10-2019-0075826

(51) Int. Cl.
*H01M 50/107*    (2021.01)
*H01M 50/136*    (2021.01)

(52) U.S. Cl.
CPC ....... *H01M 50/107* (2021.01); *H01M 50/136* (2021.01); *H01M 2220/20* (2013.01)

(58) Field of Classification Search
CPC ............. H01M 50/107; H01M 50/136; H01M 2220/20
See application file for complete search history.

(56) References Cited

U.S. PATENT DOCUMENTS

| | | |
|---|---|---|
| 8,465,866 B2 | 6/2013 | Kim |
| 8,999,557 B2 | 4/2015 | Kim |
| 10,199,676 B2 | 2/2019 | Ju |

(Continued)

FOREIGN PATENT DOCUMENTS

| | | |
|---|---|---|
| CN | 103904261 A | 7/2014 |
| CN | 104521024 A | 4/2015 |

(Continued)

OTHER PUBLICATIONS

Search report from International Application No. PCT/KR2020/004890, dated Jul. 28, 2020.

(Continued)

*Primary Examiner* — Jane J Rhee
(74) *Attorney, Agent, or Firm* — Lerner, David, Littenberg, Krumholz & Mentlik, LLP

(57) ABSTRACT

The present disclosure relates to a battery module including: a battery cell stack in which a plurality of battery cells are stacked, and a frame member in which the battery cell stack is inserted, wherein the frame member includes plane surface parts covering the upper and lower surfaces of the battery cell stack, and curved surface parts covering both side surfaces of the battery cell stack, wherein the curved surface parts are formed on both side surfaces of the frame member located along the stacking direction of the battery cell stack, and wherein the curved surface parts support the battery cell stack.

13 Claims, 4 Drawing Sheets

(56) References Cited

U.S. PATENT DOCUMENTS

| | | |
|---|---|---|
| 2005/0064268 A1 | 3/2005 | Cho et al. |
| 2010/0122461 A1 | 5/2010 | Minas et al. |
| 2011/0262797 A1 | 10/2011 | Kim |
| 2011/0262799 A1 | 10/2011 | Kim |
| 2015/0214570 A1 | 7/2015 | Deponte et al. |
| 2016/0308242 A1 | 10/2016 | Ju |
| 2017/0047562 A1 | 2/2017 | Ogawa et al. |
| 2017/0256761 A1 | 9/2017 | Ogawa et al. |
| 2018/0287116 A1 | 10/2018 | Seo et al. |
| 2019/0013501 A1 | 1/2019 | Sakurai |
| 2019/0267591 A1 | 8/2019 | Park et al. |

FOREIGN PATENT DOCUMENTS

| | | |
|---|---|---|
| CN | 104781947 A | 7/2015 |
| CN | 106450072 A | 2/2017 |
| CN | 206849914 U | 1/2018 |
| CN | 107946507 A | 4/2018 |
| CN | 108140774 A | 6/2018 |
| EP | 2885827 B1 | 8/2017 |
| EP | 2875547 B1 | 5/2018 |
| EP | 3576180 A1 | 12/2019 |
| JP | 2005142145 A | 6/2005 |
| JP | 2009182001 A | 8/2009 |
| JP | 2012119232 A | 6/2012 |
| JP | 2012160347 A | 8/2012 |
| JP | 2017037789 A | 2/2017 |
| JP | 2017162810 A | 9/2017 |
| KR | 20070025734 A | 3/2007 |
| KR | 20110117585 A | 10/2011 |
| KR | 20110117586 A | 10/2011 |
| KR | 20160123091 A | 10/2016 |
| KR | 20170083834 A | 7/2017 |
| KR | 20190037579 A | 4/2019 |
| WO | 2018186664 A1 | 10/2018 |

OTHER PUBLICATIONS

Extended European Search Report including Written Opinion for Application No. 20792919.1 dated Jun. 18, 2021, 6 pages.

Search Report dated Aug. 9, 2022 from the Office Action for Chinese Application No. 202080002940.8 issued Aug. 16, 2022, 3 pages.

【FIG. 1】
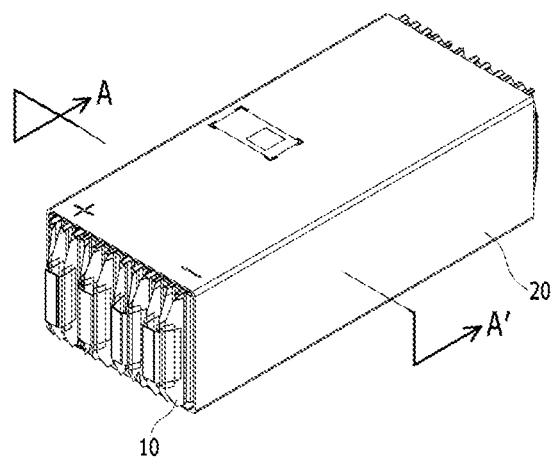
[PRIOR ART]
【FIG. 2】
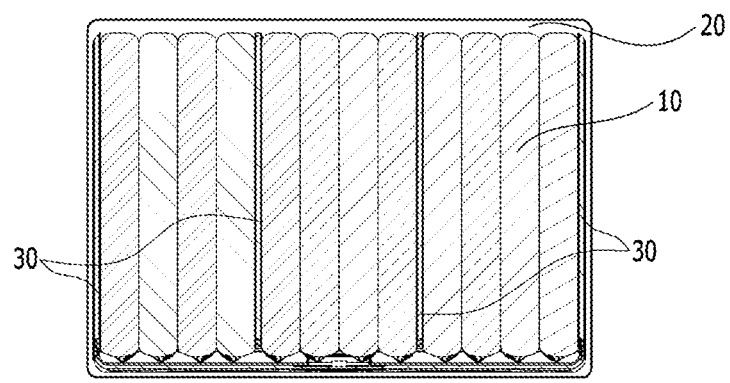
[PRIOR ART]

[FIG. 3]
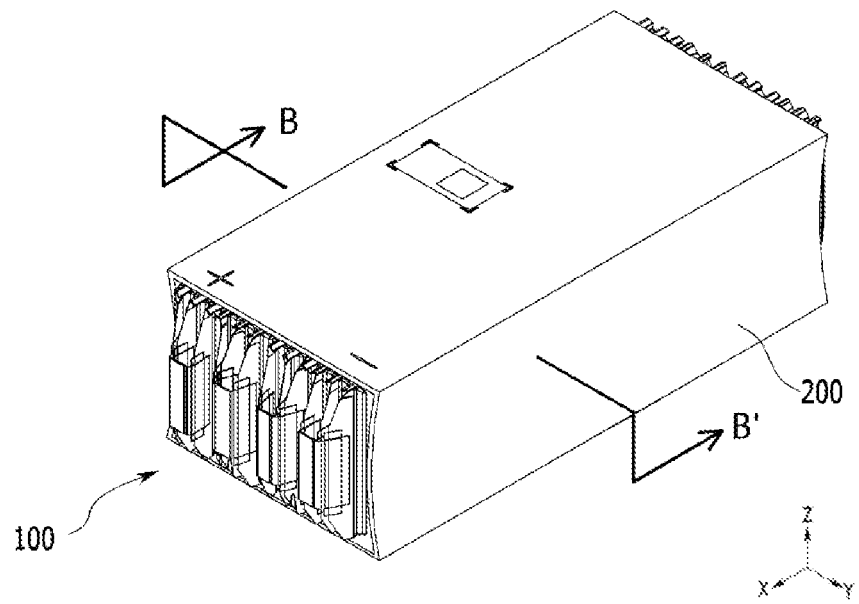
[FIG. 4]
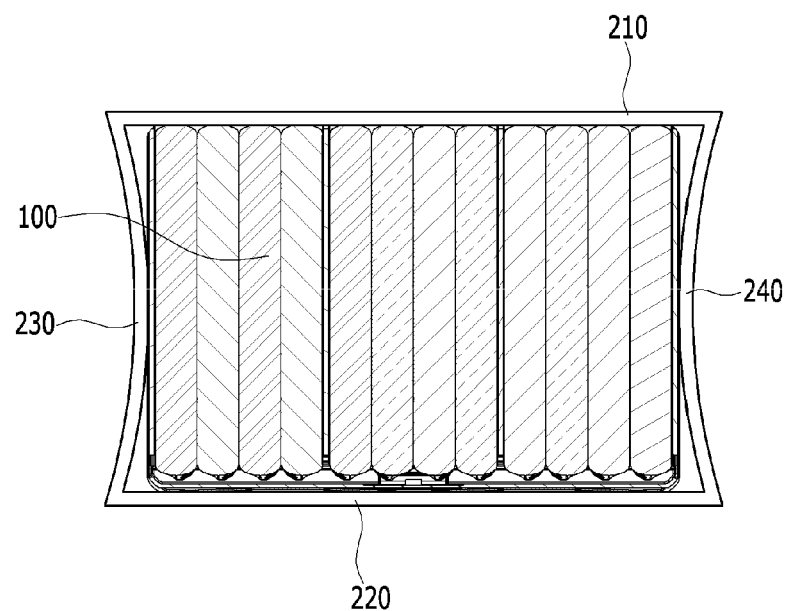

[FIG. 5]
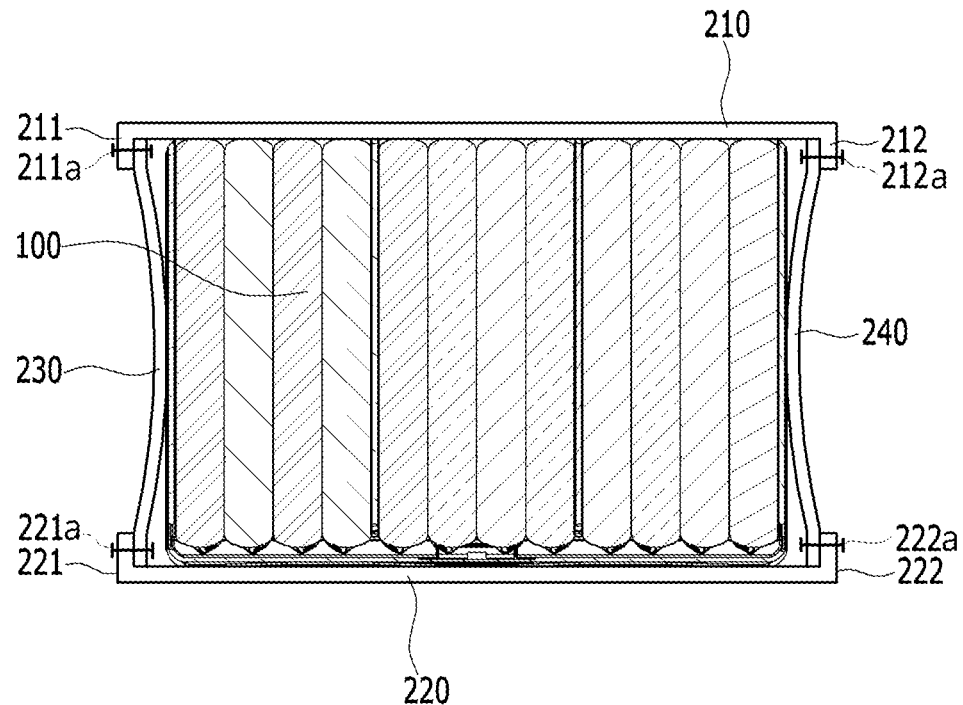
[FIG. 6]
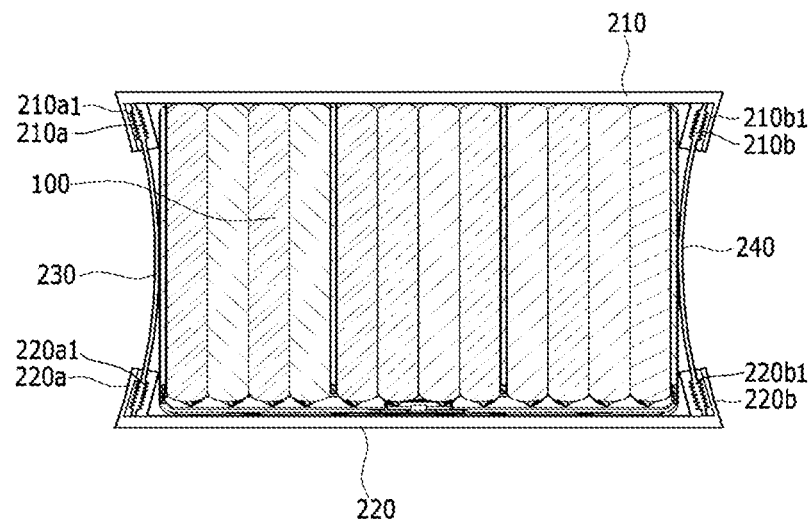

[FIG. 7]
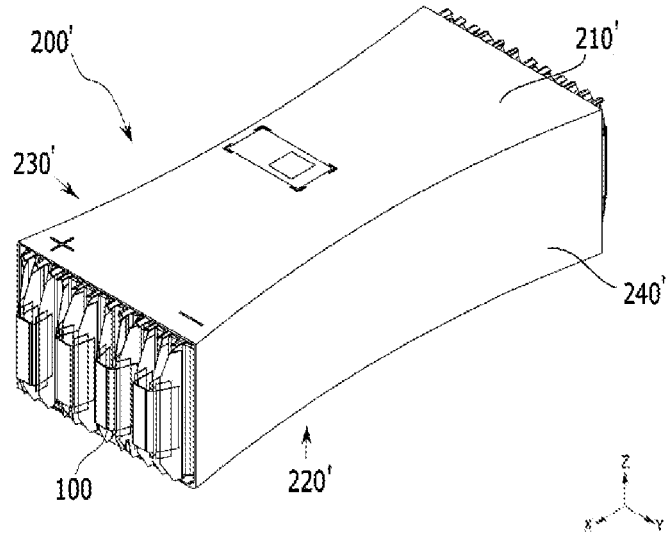
[FIG. 8]
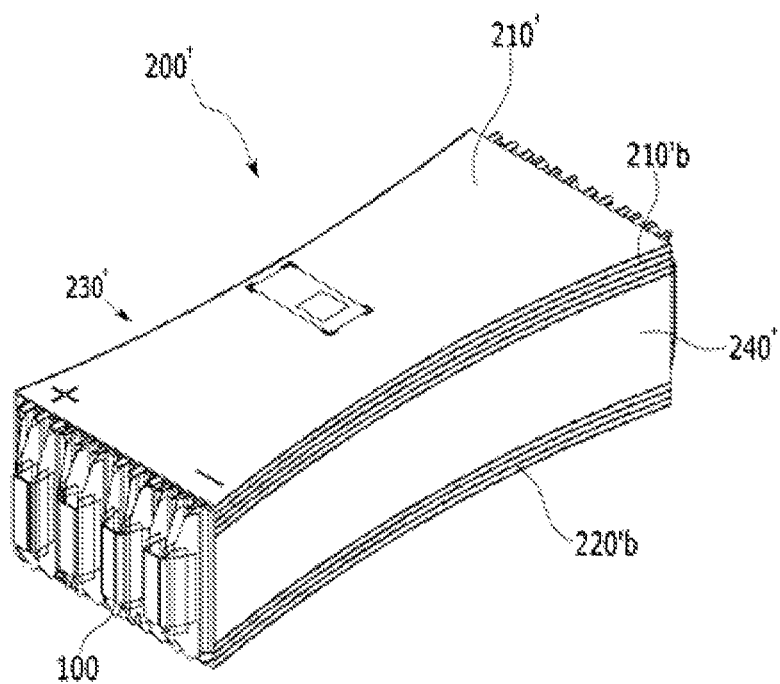

BATTERY MODULE AND BATTERY PACK INCLUDING THE SAME

CROSS-REFERENCE TO RELATED APPLICATIONS

This application is a national phase entry under 35 U.S.C. § 371 of PCT/KR2020/004890, filed on Apr. 10, 2020, which claims the benefit of Korean Patent Application No. 10-2019-0075826, filed on Jun. 25, 2019, with the Korean Intellectual Property Office, the disclosures of which are each incorporated herein by reference in their entirety.

TECHNICAL FIELD

The present disclosure relates to a battery module and a battery pack including the same, and more particularly, to a battery module that reduces an assembling tolerance and a swelling of the battery module, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack. It is common to configure a battery module composed of at least one battery cell, and to configure a battery pack by using at least one of the battery modules and adding other components.

The battery module includes a battery cell stack in which a plurality of battery cells are stacked, and a frame member covering the battery cell stack to protect the battery cell stack.

FIG. 1 is a perspective view of a conventional battery module. FIG. 2 is a view showing a state where pads are inserted between the battery cells, which is taken along the line A-A' in FIG. 1.

Referring to FIGS. 1 and 2, the conventional battery module is accommodated inside a frame 20 formed on the upper, lower, left, and right surfaces of a battery cell stack in which a plurality of battery cells 10 are stacked. At this time, as shown in FIG. 2, compression pad 30 was inserted between the plurality of battery cells.

The compression pad 30 may generate a repulsive force between the battery cell 10 and the frame 20 to fix the battery cell 10 stack inside the frame 20, and can reduce an assembling tolerance that occurs when assembling the battery cell stack inside the frame 20. Further, when a swelling of the battery cell 10 occurs due to the temperature rise of the battery cell 10, compression pad 30 performs a function of absorbing the amount of an increase in volume due to the swelling.

However, the above-mentioned compression pad has a problem in that the expansion force due to compression is limited, and thus the assembly tolerance absorption amount and the swelling absorption amount are limited.

Moreover, since the compression pad has physical properties of the pad itself and is interposed between adjacent battery cells or between the battery cell and the frame, it has a positional characteristic of receiving pressure from both sides. Consequently, as the compression pad is repeatedly compressed and contracted, the elasticity of the compression pad gradually decreases, which causes a problem that it is difficult to properly perform the assembly tolerance absorption and swelling absorption functions for a long time.

In addition, in the process of assembling the battery cell stack into the frame, since the compression pad needs to be inserted and installed between the battery cells of the battery cell stack, the assembling process is complicated and the compression pad must be separately manufactured and produced.

DETAILED DESCRIPTION OF THE INVENTION

Technical Problem

It is an object of the present disclosure to provide a battery module having excellent assembly tolerance absorption amount and swelling absorption amount, and a battery pack including the same.

It is another object of the present disclosure to provide a battery module capable of continuously performing an assembly tolerance absorption function and a swelling absorption function, and a battery pack including the same.

It is yet another object of the present disclosure to provide a battery module capable of continuously performing an assembly tolerance absorption function and a swelling absorption functions by utilizing a simpler structure, and a battery pack including the same.

Technical problems to be solved by the present disclosure are not limited to the above-mentioned technical problems, and other technical problems, which are not mentioned above, may be dearly understood from the following descriptions by those skilled in the art to which the present disclosure pertains.

Technical Solution

According to one embodiment of the present disclosure, there is provided a battery module comprising: a battery cell stack in which a plurality of battery cells are stacked, and a frame member in which the battery cell stack is inserted, wherein the frame member includes plane surface parts covering upper and lower surfaces of the battery cell stack, and curved surface parts covering both side surfaces of the battery cell stack, wherein the curved surface parts are formed on both side surfaces of the frame member located along a stacking direction of the battery cell stack, and wherein the curved surface parts support the battery cell stack.

Each one of the curved surface parts may be formed so as to be bent in an inner direction of the frame member on a vertical cross section of the frame member.

Each one of the curved surface part may be formed of an elastic member that exerts an elastic force in the stacking direction of the plurality of battery cells.

The elastic member may be formed of a plate spring.

A hook part may be formed at both ends of the plane surface parts to engage a respective one of the elastic members.

The battery module may further comprise a curved surface part-fixing material that fixes the curved surface part and the hook part.

A corrugation part capable of elastic deformation may be formed on the elastic member.

First and second corrugation parts may be formed at upper and lower ends of the elastic member, respectively, and the first and second corrugation parts may be connected to a respective one of the plane surface parts.

The battery module may further comprise a corrugation part supporting base that supports the corrugation part on both sides of the frame.

Each one of the corrugation parts may be elastically deformed along a longitudinal direction of the elastic member.

The curved surface part may be formed so as to be bent in an inner direction of the frame member on a horizontal cross-section of the frame member.

Both end edges of the plane surface part may be formed to correspond to the upper and lower edge parts of the curved surface part.

Each one of the curved surface parts may be formed of an elastic member that is configured to exert an elastic force in the stacking direction of the battery cell stack, and the corrugation part may be formed on the elastic member.

First and second corrugation parts may be formed at upper and lower ends of the elastic member, respectively, and the first and second corrugation parts may each be connected to a respective one of the plane surface part.

A battery pack according to another embodiment of the present disclosure includes the above-mentioned battery module.

Advantageous Effects

A battery module and a battery pack including the same according to an embodiment of the present disclosure facilitate compression and expansion of the curved surface part, and thus provides an effect of improving an assembly tolerance absorption amount and a swelling absorption amount.

In addition, the battery module and the battery pack including the same according to an embodiment of the present disclosure provide an effect capable of continuously maintaining elasticity without reducing the elasticity since the curved surface part is formed of an elastic member.

Further, the battery module and the battery pack including the same according to an embodiment of the present disclosure absorbs the assembly tolerance and the swelling using a conventional frame member, and thus provides an effect of absorbing the assembly tolerance and the swelling through a simpler structure.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module.

FIG. 2 is a view showing a state where pads are inserted between the battery cells, which is taken along the line A-A' in FIG. 1.

FIG. 3 is a view showing a battery module in which the curved surface part is formed so as to be bent in the inner direction of the frame member on the vertical cross-section of the frame member in accordance with a first embodiment of the present disclosure.

FIG. 4 is a view showing a part taken along a line B-B' of FIG. 3.

FIG. 5 is a cross-sectional view taken along the line B-B' of FIG. 3, showing a battery module in which an elastic member and a hook part are formed in accordance with a second embodiment of the present disclosure.

FIG. 6 is a sectional view taken along the line B-B' in FIG. 3, showing a battery module in which a corrugation part is formed in accordance with a third embodiment of the present disclosure.

FIG. 7 is a perspective view showing a battery module in which the curved surface part is formed so as to be bent in the inner direction of the frame member on the horizontal cross-section of the frame member in accordance with a fourth embodiment of the present disclosure.

FIG. 8 is a perspective view showing a battery module in which the curved surface part is formed so as to be bent in the inner direction of the frame member on the horizontal cross section of the frame member, and the corrugation part is formed, in accordance with a fifth embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to one embodiment of the present disclosure will be described with reference to FIGS. 3 to 4.

FIG. 3 is a view showing a battery module in which the curved surface part is formed so as to be bent in the inner direction of the frame member on the vertical cross section of the frame member in accordance with a first embodiment of the present disclosure. FIG. 4 is a view showing a part taken along a line B-B' of FIG. 3.

Referring to FIGS. 3 and 4, a battery module according to a first embodiment of the present disclosure comprises: a battery cell stack in which a plurality of battery cells 100 are stacked, and a frame member 200 in which the battery cell stack is inserted, wherein the frame member 200 includes plane surface parts 210 and 220 covering the upper and lower surfaces of the battery cell stack, and curved surface parts 230 and 240 covering both side surfaces of the battery cell stack, wherein the curved surface parts 230 and 240 are formed on both side surfaces of the frame member 200 located along the stacking direction of the battery cell stack, and wherein the curved surface parts 230 and 240 support the battery cell stack.

At this time, the curved surface parts 230 and 240 may be formed so as to be bent in an inner direction of the frame member 200 on the vertical cross section of the frame member 200. In more detail, the curved surface parts 230 and 240 may be configured such that the curved surface parts 230 and 240 look curved in the y-axis direction, when the curved surface parts 230 and 240 of FIG. 3 are cut into the yz plane.

The battery cell 100 is a secondary battery, and may be configured as a pouch type secondary battery. The battery cell 100 may be composed of a plurality of cells, and the plurality of battery cells 100 may be stacked with each other so as to be electrically connected to each other, thereby forming a battery cell stack. Each of the plurality of battery cells may include an electrode assembly, a battery case, and an electrode lead protruding from the electrode assembly. A busbar frame capable of electrically connecting electrode leads may be formed on front and rear surfaces of the battery cell stack.

As in the first embodiment of the present disclosure, the curved surface parts 230 and 240 are formed so as to be bent in the inner direction of the frame member 200, so that the assembly tolerance absorption and swelling absorption functions can be performed only by the curved surface parts 230 and 240 that are bent, without a separate configuration such as a conventional compression pad. By making it possible to absorb the assembly tolerance and swelling of the battery cell using both side surfaces of the frame member provided to protect the existing battery cell stack in this way, it became possible to absorb an assembling tolerance and a swelling in a more simple and efficient manner.

The plane surface parts 210 and 220 and the curved surface parts 230 and 240 of the frame member 200 may be integrally formed. The frame member 200 may be formed of aluminum. However, the material of the frame member 200 is not limited to aluminum, and it can be formed of various materials within a range capable of bending deformation for absorbing assembly tolerance and absorbing swelling.

Hereinafter, the battery module according to a second embodiment of the present disclosure will be described with reference to FIG. 5.

FIG. 5 is a cross-sectional view taken along the line BB' of FIG. 3, showing a battery module in which an elastic member and a hook part are formed in accordance with a second embodiment of the present disclosure.

Referring to FIG. 5, the battery module according to the second embodiment of the present disclosure may be configured such that the curved surface parts 230 and 240 of the frame member 200 are formed of elastic members 230 and 240 that exert an elastic force in the stacking direction of the battery cell 100. By making it possible to absorb the assembling tolerance and swelling of the battery cells using the elastic members 230 and 240 located at the outermost part of the battery module in this way, the deformation range of the curved surface parts 230 and 240 can be widened, so that the assembling tolerance and the swelling absorption amount can be increased, and the elasticity can be continuously maintained.

The elastic members 230 and 240 may be formed of plate springs. However, the elastic members 230 and 240 are not limited to the plate spring, and they can be formed of various materials within a range capable of bending deformation of the elastic member for smoothly absorbing assembly tolerance and absorbing swelling.

The elastic members 230 and 240 may be separately manufactured from the plane surface parts 210 and 220. Also, the elastic members 230 and 240 are fixed to the plane surface parts 210 and 220, and hook parts 211, 212, 221 and 222 may be formed so that the elastic members 230 and 240 are engaged so as not to be separated from the frame member.

The hook parts 211, 212, 221 and 222 are configured such that two hook parts 211 and 212 are formed at both ends of the upper plane surface part 210, and two hook parts 221 and 222 are formed at both ends of the lower plane surface part 220, respectively, so that they can fix and support the upper and lower ends of the elastic members 230 and 240.

The curved surface part-fixing materials 211a, 212a, 221a, and 212a may connect and fix the hook parts 211, 212, 221, and 222 that are engaged with the curved surface parts 230, 240 and the plane surface parts 210, 220. In more detail, the curved surface part-fixing material 211a connects and fixes the hook part 211 formed at one end of the plane surface part 210 and the upper end of the curved surface part 230. The curved surface part-fixing material 212a connects and fixes the hook part 212 formed at the other end of the plane surface part 210, and the upper end of the curved surface part 240. The curved surface part-fixing material 221a connects and fixes the hook part 221 formed at one end of the plane surface part 220 and the lower end of the curved surface part 230, and the curved surface part-fixing material 222a connects and fixes the hook part 222 formed at the other end of the plane surface part 220, and the lower end of the curved surface part 240.

It is possible to prevent the curved surface parts 230 and 240 and the plane surface parts 210 and 220 from being separated through the curved surface part-fixing materials 211a, 212a, 221a and 212a, and to prevent the generation of interference between the frame member 200 and the plurality of battery cells 100 when the curved surface parts 230 and 240 formed of the elastic member are elastically deformed. The curved surface part-fixing materials 211a, 212a, 221a and 212a may be formed of bolts and nuts, and fix through the hook parts 211, 212, 221 and 222 and the curved surface parts 230, 240. However, the fixing method is not limited to the above-mentioned embodiments, and it is possible to connect and fix the hook parts 211, 212, 221 and 222 to the curved surface parts 230 and 240 through various fixing methods.

Configurations other than those described above are the same as described in the first embodiment of the present disclosure.

Hereinafter, a battery module according to a third embodiment of the present disclosure will be described with reference to FIG. 6.

FIG. 6 is a sectional view taken along the line B-B' in FIG. 3, showing a battery module in which a corrugation part is formed in accordance with a third embodiment of the present disclosure.

Referring to FIG. 6, the battery module according to the third embodiment of the present disclosure is configured such that both side surfaces of the frame member 200 is formed of elastic members 230 and 240 that exerts an elastic force in the stacking direction of the battery cells 100. Corrugation parts 210a, 210b, 220a and 220b which are elastically deformable in the longitudinal direction of the elastic members 230 and 240 may be formed at upper and lower ends of the elastic members 230 and 240, respectively. The corrugation parts 210a, 210b, 220a and 220b are formed on the elastic members 230 and 240 in this way, thus making it possible to increase the elastic deformation range of the elastic members 230 and 240. The corrugation parts 210a, 210b, 220a and 220b may be formed of a material having excellent elasticity.

Of the corrugation parts 210a, 210b, 220a, and 220b, two corrugation parts 210a, 220a may be formed at the upper and lower ends of one side elastic member 230 of the frame member, and the other two corrugation parts 210b, 220b may be formed at the upper and lower ends of the other side elastic member 240 of the frame member, respectively.

Since the corrugation parts 210a, 210b, 220a, and 220b are excellent in elasticity, which may cause a problem that they can be detached from the frame member 200. Thus, the corrugation parts 210a, 210b, 220a and 220b and the elastic member 230 and 240 can be fixed and supported to the plane surface parts 210 and 220 via the corrugation part supporting bases 210a1, 210b1, 220a1 and 220b1.

The corrugation part supporting bases 210a1, 210b1, 220a1 and 220b1 may be respectively formed at both ends of the plane surface parts 210 and 220. At this time, of the corrugation part supporting bases 210a1, 210b1, 220a1, and 220b1, the two corrugation part supporting bases 210a1 and 210b1 are formed on the upper plane surface part 210, and the other two corrugation part supporting bases 220a1 and 220b1 may be formed on the lower plane surface part 220.

The upper and lower ends of the elastic members 230 and 240 formed with the corrugation parts 210a, 210b, 220a and 220b are respectively inserted and coupled in the corrugation part supporting bases 210a1, 210b1, 220a1 and 220b1 and thus, can be fixed and supported to the plane surface parts 210 and 220.

Configurations other than those described above are the same as described in the first embodiment of the present disclosure.

Hereinafter, a battery module according to a fourth embodiment of the present disclosure will be described with reference to FIG. 7.

FIG. 7 is a perspective view showing a battery module in which the curved surface part is formed so as to bent in the inner direction of the frame member 200 on the horizontal cross-section of the frame member in accordance with a fourth embodiment of the present disclosure.

Referring to FIG. 7, the battery module according to the fourth embodiment of the present disclosure is configured such that the curved surface parts 230 ' and 240' of the frame member 200' can be formed so as to be bent in an inner direction on a horizontal cross section of the frame member 200'. In more detail, it can be configured such that the curved surface parts 230' and 240' look curved in the y-axis direction, when the curved surface parts 230 and 240 of FIG. 3 are cut into the xy plane.

As the curved surface parts 230' and 240' are bent on a horizontal cross-section, both side edges of the plane surface parts 210' and 220' may be formed so that a waist part has a concave shape so as to correspond to the upper and lower edges of the curved surface parts 230' and 240'.

Configurations other than the contents described above is the same as described the first embodiment of the present disclosure.

Hereinafter, a battery module according to a fifth embodiment of the present disclosure will be described with reference to FIG. 8.

FIG. 8 is a perspective view showing a battery module in which the curved surface part is formed so as to bent in the inner direction of the frame member on the horizontal cross-section of the frame member, and the corrugation part is formed, in accordance with a fifth embodiment of the present disclosure.

Referring to FIG. 8, the battery module according to the fifth embodiment of the present disclosure is configured such that the curved surface parts 230' and 240' are formed so as to be bent in the inner direction of the frame member 200' on the horizontal cross-section of the frame member 200', and at the upper and lower ends of the curved surface parts 230' and 240', the corrugation parts capable of elastic deformation in the longitudinal direction of the curved surface parts 230' and 240' may be formed respectively.

By forming the corrugation parts on the curved portions 230', 240' in this way, the elastic deformation ranges of the curved surface parts 230' and 240' are increased, so that it is possible to more flexibly cope with an assembling tolerance and a swelling. The corrugation parts may be formed of a material having excellent elasticity.

Of the corrugation parts, two corrugation parts are respectively formed at the upper and lower ends of one side curved surface part 230', and the other two corrugation parts 210'b and 220'b may be respectively formed on the upper and lower ends of the other side curved surface part 240'.

Configurations other than the contents described above are the same as described in the first, third, and fourth embodiments of the present disclosure.

The battery module described above may be included in the battery pack. The battery pack may have a structure in which one or more battery modules according to the present embodiment are collected, and then packed by adding a battery management system (RMS) and a cooling device to manage the temperature or voltage of the battery.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell
200(200'): frame
210, 220(210', 220'): plane surface part
230, 240(230', 240'): curved surface part
211, 212, 221, 222: hook part
210a, 210b, 220a, 220b (210'b, 220'b): corrugation parts
210a1, 210b1, 220a1, 220b1: corrugation part supporting bases
211a, 212a, 221a, 212a: curved surface part-fixing material

The invention claimed is:

1. A battery module comprising:
   a battery cell stack in which a plurality of battery cells are stacked, and
   a frame member in which the battery cell stack is inserted,
   wherein the frame member includes plane surface parts covering upper and lower surfaces of the battery cell stack, and curved surface parts covering both side surfaces of the battery cell stack,
   wherein the curved surface parts are formed on both side surfaces of the frame member located along a stacking direction of the battery cell stack,
   wherein the curved surface parts are formed of an elastic member that exerts an elastic force in a stacking direction of the plurality of battery cells to support the battery cell stack,
   wherein a corrugation part capable of elastic deformation is formed on the elastic member, and
   wherein the corrugation part includes first and second corrugation parts formed at upper and lower ends of the elastic member, respectively, and each of the first and second corrugation parts are connected to a respective one of the plane surface parts.

2. The battery module of claim 1,
   wherein each one of the curved surface parts is formed so as to be bent in an inner direction of the frame member on a vertical cross section of the frame member.

3. The battery module of claim 1,
   wherein the elastic member is formed of a plate spring.

4. The battery module of claim 1,
   wherein a hook part is formed at both ends of the plane surface part to engage a respective one of the elastic members.

5. The battery module of claim 4,
   further comprising a curved surface part-fixing material that fixes the curved surface part and the hook part.

6. The battery module of claim 1,
   further comprising a corrugation part supporting base part that supports the corrugation part on both sides of the frame member.

7. The battery module of claim 1,
   wherein each one of the corrugation parts are configured to be elastically deformed along a longitudinal direction of the elastic member.

8. The battery module of claim 1,
   wherein the curved surface part is formed so as to be bent in an inner direction of the frame member on a horizontal cross section of the frame member.

9. The battery module of claim 8,
   wherein both end edges of the plane surface parts are formed to correspond to the upper and lower edge parts of the curved surface part.

10. The battery module of claim 8,
    wherein each one of the curved surface parts is formed of an elastic member that is configured to exert an elastic force in the stacking direction of the battery cell stack, and wherein a corrugation part is formed on the elastic member.

11. The battery module of claim 10,
    wherein first and second corrugation parts are formed at upper and lower ends of the elastic member, respectively, and the first and second corrugation parts are each connected to a respective one of the plane surface parts.

12. A battery pack comprising the battery module according to claim 1.

13. The battery module of claim 1, wherein the first and second corrugation parts are formed only at the upper and lower ends of the elastic member, respectively.

* * * * *